(12) United States Patent
Cheng et al.

(10) Patent No.: US 10,358,728 B2
(45) Date of Patent: Jul. 23, 2019

(54) ELECTRODE MATERIAL AND ITS APPLICATIONS IN DIRECT FUEL CELL AND ELECTROCHEMICAL HYDROGENATION ELECTROLYTIC TANK

(71) Applicant: HYNERGY TECHNOLOGIES INTERNATIONAL, LTD, Zhangjiagang, Jiangsu Province (CN)

(72) Inventors: Hansong Cheng, Hubei (CN); Chaoqun Han, Hubei (CN); Ming Yang, Hubei (CN); Gang Ni, Hubei (CN); Liang Huang, Hubei (CN); Libin Pei, Hubei (CN)

(73) Assignee: WUHAN HYNERTECH CO., LTD., Wuhan (CN)

(*) Notice: Subject to any disclaimer, the term of this patent is extended or adjusted under 35 U.S.C. 154(b) by 776 days.

(21) Appl. No.: 14/577,492

(22) Filed: Dec. 19, 2014

(65) Prior Publication Data

US 2015/0105244 A1    Apr. 16, 2015

Related U.S. Application Data

(63) Continuation of application No. PCT/CN2013/074672, filed on Apr. 25, 2013.

(30) Foreign Application Priority Data

Jun. 20, 2012    (CN) .......................... 2012 1 0204765

(51) Int. Cl.
*C25B 11/04*    (2006.01)
*H01M 4/92*    (2006.01)
(Continued)

(52) U.S. Cl.
CPC .......... *C25B 11/0452* (2013.01); *C25B 11/04* (2013.01); *C25B 11/0478* (2013.01);
(Continued)

(58) Field of Classification Search
None
See application file for complete search history.

(56) References Cited

U.S. PATENT DOCUMENTS 3,883,607 A * 5/1975 Neikam .................... C07C 5/03
                                                                    502/255
5,324,599 A * 6/1994 Oyama ................... H01M 4/60
                                                                    252/182.1
(Continued)

FOREIGN PATENT DOCUMENTS

CN         101000961 A        7/2007
CN         101185186 A        5/2008
(Continued)

OTHER PUBLICATIONS

Federal Register, vol. 76, No. 27, pp. 7162-7175 issued Feb. 9, 2011 which details Supplementary Examination Guidelines for Determining Compliance with 35 U.S.C. 112 and for Treatment of Related Issues in Patent Applications.*
(Continued)

*Primary Examiner* — Amanda J Barrow
(74) *Attorney, Agent, or Firm* — Locke Lord LLP; Tim Tingkang Xia, Esq.

(57) ABSTRACT

An electrode material for a direct fuel cell or an electrochemical hydrogenation electrolytic tank, includes component A, or component B, or the mixture of component A and component B. The component A is any one of or a mixture of two or more than two of $H_nNb_2O_5$, $H_nV_2O_5$, $H_nMoO_3$, $H_nTa_2O_5$ or $H_nWO_3$ at any ratio, where $0<n\le 4$. The component B is any one of or a mixture of two or more than two of $Nb_2O_5$, $V_2O_5$, $MoO_3$, $Ta_2O_5$, $WO_3$ at any ratio.

2 Claims, 1 Drawing Sheet

(51) Int. Cl.
*H01M 4/86* (2006.01)
*H01M 4/90* (2006.01)
*H01M 8/1009* (2016.01)
*H01M 8/22* (2006.01)
*H01M 8/04082* (2016.01)

(52) U.S. Cl.
CPC ....... *C25B 11/0484* (2013.01); *H01M 4/8652* (2013.01); *H01M 4/9016* (2013.01); *H01M 4/9041* (2013.01); *H01M 4/92* (2013.01); *H01M 8/04216* (2013.01); *H01M 8/1009* (2013.01); *H01M 8/22* (2013.01); *H01M 8/222* (2013.01); *H01M 2250/10* (2013.01)

(56) References Cited

U.S. PATENT DOCUMENTS

| | | | | |
|---|---|---|---|---|
| 5,922,488 | A | * | 7/1999 | Marucchi-Soos .... B01J 23/6527 204/291 |
| 2006/0257716 | A1 | * | 11/2006 | Christian ................ B01J 21/18 429/482 |
| 2006/0263675 | A1 | * | 11/2006 | Adzic ...................... B01J 23/42 429/424 |
| 2007/0202386 | A1 | * | 8/2007 | Matsuoka et al. ...... H01M 4/86 429/40 |
| 2007/0231632 | A1 | * | 10/2007 | Zhao ........................ C01B 3/26 429/411 |
| 2008/0230380 | A1 | | 9/2008 | Ohsaka et al. |
| 2009/0081511 | A1 | | 3/2009 | Miyazaki et al. |
| 2010/0151295 | A1 | * | 6/2010 | Halalay ............... H01M 4/8647 429/492 |
| 2011/0226627 | A1 | * | 9/2011 | Krstajic .............. C25B 11/0478 205/109 |
| 2012/0107719 | A1 | * | 5/2012 | Liao .................... H01M 4/8803 429/482 |

FOREIGN PATENT DOCUMENTS

| | | | | |
|---|---|---|---|---|
| CN | 101362093 | * | 2/2009 | ............. B01J 23/89 |
| CN | 101401235 | A | 4/2009 | |
| CN | 102441410 | A | 5/2012 | |
| WO | 2004088780 | A1 | 10/2004 | |
| WO | WO 2011/009307 | * | 1/2011 | ............. H01M 4/90 |

OTHER PUBLICATIONS

Zhang et al., "Electro-Oxidation of Ethanol on Pt—WO3/C Electrocatalyst," Electrochemical & Solid State Letters, 9 (9) A423-A426, available electronically Jun. 28, 2006.*

Xiang et al., "Dispersed platinum supported by hydrogen molybendum bronze-modified carbon as electrocatalyst for methanol oxidation," J. Solid State Electrochem (2010) 14: 903-908, Published online Dec. 23, 2009.*

Adams et al., "Proton Ordering in the Peierls-Distorted Hydrogen Molybednum Bronze H0.33MoO3: Structure and Physical Properties," Acta Cryst. (1993), B49, 958-967.*

Moberg et al., "Mechanism of Hydrodeoxygenation of Acrolein on a Cluster MOdel of MoO3," J. Phys. Chem C 2010, 114, 13782-13795 (Year: 2010).*

Ressler et al., "Formation of Bronzes during Temperature-programmed Reduction of MoO3 with Hydrogen—An in situ XRD and XAFS study," Solid State Ionics 141-142 (2001) 243-252 (Year: 2001).*

Smith et al., "The Structure Sensitivity of HxMoO3 Precipitation on MoO3 (010) during Reactions with Methanol," J. Catalysts, 184, 49-58 (1999) (Year: 1999).*

Castro et al, "Molybdenum Oxides—From Fundamentals to Functionality," Adv. Mater. 2017, 29, 1701619-1701619 (Year: 2017).*

Sha et al., "Hydrogen Absorption and Diffusion in Bulk α-MoO3," J. Phys. Chem. C, 2009, 113, 11399-11407 (Year: 2009).*

International Search Report issued by State Intellectual Property Office of the P. R. China dated Jul. 5, 2013 for Application No. PCT/CN2013/074672.

* cited by examiner

ELECTRODE MATERIAL AND ITS APPLICATIONS IN DIRECT FUEL CELL AND ELECTROCHEMICAL HYDROGENATION ELECTROLYTIC TANK

CROSS-REFERENCE TO RELATED APPLICATIONS

This non-provisional application is a continuation application of International Patent Application No. PCT/CN2013/074672 filed Apr. 25, 2013, entitled "ELECTRODE MATERIAL, USE THEREOF, DIRECT FUEL CELL AND ELECTROCHEMICAL HYDROGENATION ELECTROLYTIC TANK," By Hansong Cheng et al., which itself claims the priority to Chinese Application No. 201210204765.8, filed Jun. 20, 2012, the disclosures for which are hereby incorporated herein in their entireties by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to the field of inorganic metal oxide catalyst materials, and more particularly to an electrode material and its applications in direct fuel cell, and electrochemical hydrogenation electrolytic tank.

BACKGROUND OF THE INVENTION

With the increasing severity of global warming and continuous consumption of fossil energy sources, it is the key to seek an efficient energy storage technology for deployment of future smart grids and efficient utilization of renewable energy sources. Various novel energy storage technologies have been proposed. However, limited by technical and cost factors, none of the technologies is commercially used successfully. It is known that hydrogen is the first element in the periodic table, has the highest mass-energy density, and is very suitable for use as an energy carrier. A novel energy storage technology that uses hydrogen energy as a carrier is a hot research topic in the world. At present, a hydrogen energy economy that is widely greeted by people is a green, environmental friendly, and sustainable social economy mode based on such a hydrogen energy carrier.

However, so far there are technical limitations in various hydrogen energy technologies so far and practical commercial application is still to be found. In these hydrogen energy application technologies: 1). For hydrogen production, hydrogen production technologies such as catalytic electrolysis of water, catalytic photolysis of water, and hydrocarbon steam reforming already become relatively mature, and some technologies have been successfully commercialized. 2). For hydrogen storage technologies, it is very difficult to store and further transport hydrogen gas at atmospheric temperature and pressure. Although currently there exist various technologies such as hydrogen storage using high-pressure steel cylinders, hydrogen storage using low-temperature condensation, hydrogen storage using adsorption of porous materials, and hydrogen storage using chemical hydrides, they have not been practically commercialized. 3). Finally, hydrogen energy utilization technologies, fuel cell technologies, and hydrogen internal combustion engine technologies have been studied for years, where the fuel cell technologies with relatively high energy utilization efficiency still have problems such as weak durability and a high production cost. In conclusion, atmospheric temperature and pressure hydrogen storage technologies and hydrogen energy utilization technologies (hydrogen fuel cell technologies) limit the development of hydrogen energy technologies.

Therefore, a heretofore unaddressed need exists in the art to address the aforementioned deficiencies and inadequacies.

SUMMARY OF THE INVENTION

In one aspect, the present invention is directed to an electrode material, use thereof, a direct fuel cell, and an electrochemical hydrogenation electrolytic tank that meet requirements of catalysis, proton storage, and proton conduction.

In one embodiment, an electrode material for a direct fuel cell or an electrochemical hydrogenation electrolytic tank includes a component A or a component B or a mixture of the component A and the component B. The component A is any one of or a mixture of two or more than two of $H_nNb_2O_5$, $H_nV_2O_5$, $H_nMoO_3$, $H_nTa_2O_5$ or $H_nWO_3$ in any ratio, where $0<n\leq 4$. The component B is any one of or a mixture of two or more than two of $Nb_2O_5$, $V_2O_5$, $MoO_3$, $Ta_2O_5$ or $WO_3$ in any ratio.

In one embodiment, without affecting functions (catalystic property, proton storage and conductivity, electrical conductivity, and the like) of the material, the electrode material further includes a component C. The component C is any one of or a mixture of two or more than two of $TiO_2$, $Cr_2O_3$, $MnO_2$, $Fe_2O_3$, $CoO$, $NiO$, $CuO$ or $ZrO_2$ in any ratio. The mass of the component C is 0.001% to 49.9% of the total mass of the electrode material.

In one embodiment, without affecting functions (catalystic property, proton storage and conductivity, electrical conductivity, and the like) of the material, the electrode material further includes a component D. The component D is any one of or a mixture of two or more than two of Fe, Co, Ni, Pt, Ir, Pd, Rh or Ru in any ratio. The mass of the component D is 0.001% to 10% of the total mass of the electrode material.

In another aspect, the present invention is directed to a use of the foregoing electrode material in a direct fuel cell or an electrochemical hydrogenation electrolytic tank.

In a further aspect, the present invention is directed to a direct fuel cell including an electrode, where the material of the electrode is the foregoing electrode material.

In one embodiment, the fuel cell is a direct fuel cell based on an organic liquid hydrogen storage material.

In one embodiment, the organic liquid hydrogen storage material is hydro-N-ethylcarbazole, cyclohexane or hydronaphthalene.

In yet another aspect, the present invention is directed to an electrochemical hydrogenation electrolytic tank including an electrode, where the material of the electrode is the foregoing electrode material.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
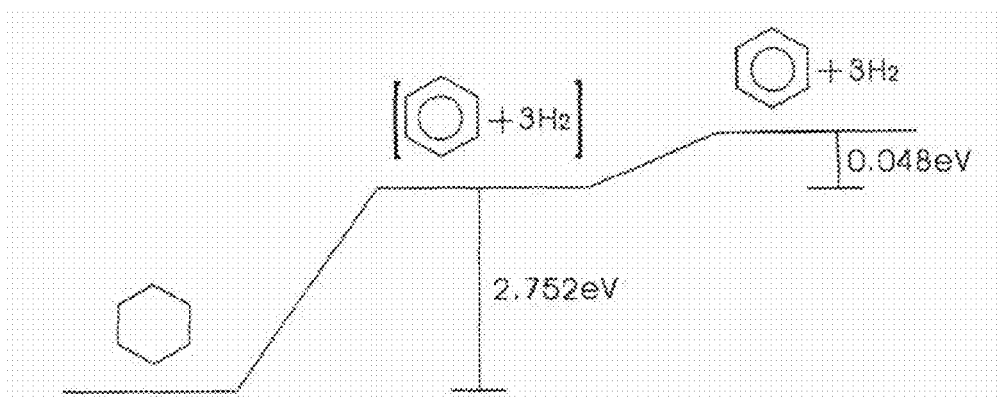
FIG. 1 is a schematic diagram of computational simulation of direct dehydrogenation of cyclohexane.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-3. In accordance with the purposes of this invention, as embodied and broadly described herein, this invention, in one aspect, relates to an electrical connector.

Fuel cell technologies may be categorized according to working temperature into: a low-temperature type (60° C. to 120° C.), a middle-temperature type (120° C. to 220° C.), and a high-temperature type (600° C. to 1000° C.). The low-temperature type fuel cell has a wide application scope and high energy utilization, and therefore has drawn much attention. Two major low-temperature type fuel cells are alkaline fuel cell and proton exchange membrane fuel cell, in which pure hydrogen gas or a hydrogen-rich organic compound (methanol, ethanol, formic acid or the like) is the main fuel source. Although the fuel cell has high energy source efficiency, when these two types of substances are used as fuels, the fuel cell is undesirable in comprehensive energy source efficiency and an environmentally friendly index.

When pure hydrogen gas is used as the fuel, the process of storing and releasing hydrogen gas consumes a large amount of energy. First, in terms of thermodynamics, for the hydrogen storage process, storage in both a physical manner and a chemical manner need to consume energy to provide pressure or heat to accomplish the hydrogenation process. For any hydrogen storage technology, a dehydrogenation process is an endothermic process, and dehydrogenation consumes energy of about 3 kcal/mol (physical adsorption) to 20 kcal/mol (chemical adsorption). Further, to accelerate the process of storing and releasing hydrogen gas, more energy is required to overcome factors in dynamics thereof. Such energy consumption has been estimated, and the hydrogen storage and release process at least consumes energy one third of the energy to be stored. It can be seen that hydrogen energy utilization efficiency is greatly reduced due to the process of storing and releasing hydrogen gas.

In a direct fuel cell such as a direct methanol fuel cell, the hydrogen-rich organic compound is used as a major fuel source. These organic compounds are usually liquids at atmospheric temperature and can be stored and transported conveniently, and no storage and transport problem exists. However, during operating of this type of fuel cell, carbon oxide (CO) gas is generated that poisons the electrode made of precious metal catalyst, which significantly shortens the service life of the fuel cell. In addition, hydrogen-rich organic compound fuels such as methanol, ethanol, and formic acid have high carbon, and the use of the fuel cell causes emissions of the greenhouse gas carbon dioxide ($CO_2$) in a large amount. Moreover, this type of fuel is unrecyclable and needs to be manufactured through industrial production depending on raw materials such as fossil energy sources or biomass, and has very limited potential in the worldwide energy crisis and food crisis. None of these adverse factors meets the development concept of future green, sustainable, novel energy sources, and practical application of this type of fuel cell technology is limited. Therefore, it becomes particularly important to develop a more efficient, environmentally friendly, and sustainable hydrogen energy utilization manner.

From the perspective of mass and energy conversion, in a hydrogen energy storage and utilization process depending on hydrogen storage materials, a process in which hydrogen gas molecules are converted into protons or hydrogen atoms accompanies energy conversion in a process of storing, releasing, and using hydrogen gas. Hydrogen gas substantially acts as an energy carrier in these processes, and various hydrogen storage materials are only substance carriers for hydrogen gas. Therefore, if molecules of a hydrogen-carrying/hydrogen storage material is directly used as an energy carrier for hydrogen energy, an adsorption and desorption process of hydrogen gas may be omitted, so that energy consumption in this process is reduced. Moreover, after desorption of hydrogen carrying/hydrogen storage molecules to obtain hydrogen energy (only hydrogen atoms are desorbed, and water is generated from reactions), hydrogen storage molecules can be recycled and re-used through hydrogenation.

However, an existing hydrogen energy utilization apparatus (fuel cell technologies) is clearly not usable to achieve such a process of direct utilization of hydrogen energy in a hydrogen carrying/hydrogen storage material without generating hydrogen gas. Through analysis on principles of conventional hydrogen direct fuel cells, we learn that an electrode catalyst is the key to normal generation of electric energy by the fuel cell. The electrode catalyst in the conventional hydrogen direct fuel cell is generally precious metal platinum (Pt), where hydrogen gas decomposes on the surface of metal Pt to generate electrons and protons, the protons pass through a proton membrane to an oxygen electrode to generate water with oxygen, and the electrons provide electric energy to load through an external circuit. However, when using the hydrogen carrying/hydrogen storage material to achieve direct hydrogen energy utilization, the conventional catalyst cannot ensure that hydrogen energy in the hydrogen carrying/hydrogen storage carrier directly generates electric energy without generating hydrogen gas. Therefore, in one aspect, the invention relates to a suitable hydrogen storage carrier, and in another aspect, the invention relates to a suitable electrode catalyst to construct a direct fuel cell based on such a hydrogen carrying/hydrogen storage material.

In certain embodiments of the invention, for a suitable hydrogen storage carrier, it is found that an organic liquid hydrogen storage material dominated by a type of polycyclic conjugated aromatic compound, for example, perhydro-N-ethylcarbazole, cyclohexane, hydronaphthalene, is very suitable for use as a fuel for this type of direct hydrogen storage material fuel cell. This type of organic liquid hydrogen storage material is liquid at atmospheric temperature and atmospheric pressure, has a relatively low dehydrogenation temperature, and is easy to store and transport.

In certain embodiments of the invention, for an electrode material, a fuel cell electrode that can directly utilize hydrogen energy in a hydrogen carrying organic liquid hydrogen storage material needs to have the following advantages:

1. First, the electrode material should have desirable catalystic performance and can catalyze the dehydrogenation reaction of a hydrogen carrying organic liquid hydrogen storage molecule, and break C—H in a hydrogen carrying organic molecule to release hydrogen energy without damaging a basic structure of a hydrogen storage organic molecule, so that the hydrogen storage organic molecule is recyclable.

2. Next, the electrode material needs to inhibit re-bonding of protons released from the hydrogen carrying organic molecule to generate hydrogen gas molecules, and ensure that the protons can be directly transferred to the oxygen electrode to produce water. Therefore, it must be ensured that the electrode material has certain proton storage capability and effective proton conduction capability, so that the generated protons are transferred in time to the oxygen electrode to generate water, thereby ensuring continuous occurrence of reaction at the electrode.

3. Finally, the electrode material must have electrical conductivity and can ensure that generated electrons can be conducted to an external circuit to provide electric energy to a load.

In one aspect, the present invention is directed to a suitable electrode material that meets the foregoing three aspects, so as to successfully construct a direct fuel cell based on such an organic liquid hydrogen storage material.

In certain embodiments, the principle of the present invention is as follows.

It is found through research that a bronze compound may be formed after proton intercalation is performed on an oxide of the early transition metal such as vanadium, niobium, molybdenum, tantalum, and tungsten, and the bronze compound has desirable electrical conductivity and proton transfer capability and can be used as a potential inexpensive electrode material. Moreover, it is found through experiments and research that $H_nMoO_3$ and a corresponding dehydrogenation product (the proton content in $H_nMoO_3$ is related to the reaction temperature) can be produced when $MoO_3$ is reacted with hydrogen carrying organic liquid hydrogen storage molecules such as hydro-N-ethylcarbazole, cyclohexane, hydronaphthalene at different temperature. This indicates that $MoO_3$ or $H_nMoO_3$ has a dehydrogenation catalystic property for this type of organic liquid hydrogen storage molecules. In addition, the temperature required for the dehydrogenation process between the hydrogen carrying organic liquid hydrogen storage molecule and $MoO_3$ or $H_nMoO_3$ is much less than the temperature required for the reaction between the hydrogen carrying organic liquid hydrogen storage molecule and the conventional fuel cell electrode catalyst Pt to produce hydrogen. This is because no hydrogen gas molecule is generated during the reaction between the hydrogen carrying organic liquid hydrogen storage molecule and the $MoO_3$ or $H_nMoO_3$, and thermodynamically less energy is needed to generate protons only. Therefore, this type of proton intercalation compounds of transition metal oxides, represented by $H_nMoO_3$, meets all the requirements of electrode material for preparing a novel fuel cell.

It should be noted here that although materials such as $H_nNb_2O_5$, $H_nV_2O_5$, $H_nMoO_3$, $H_nTa_2O_5$ or $H_nWO_3$ and corresponding oxides $Nb_2O_5$, $V_2O_5$, $MoO_3$, $Ta_2O_5$ or $WO_3$ may fail to meet the foregoing three requirements for selecting an electrode material because of undesirable electrical conductivity, if these materials are made into an electrode material and are applied in a direct fuel cell based on an organic liquid hydrogen storage material or a hydrogenation electrolytic tank, these materials is converted into the corresponding proton intercalation compound, and therefore it also becomes possible to make these materials into electrode materials. Therefore, in the present invention, $H_nNb_2O_5$, $H_nV_2O_5$, $H_nMoO_3$, $H_nTa_2O_5$, $H_nWO_3$ and $Nb_2O_5$, $V_2O_5$, $MoO_3$, $Ta_2O_5$, $WO_3$ are all used as main component of candidate electrode materials.

An electrode material that meets the foregoing three conditions may also be applied to the preparation of one type of electrolytic tank electrode that uses water to perform direct electrochemical hydrogenation on an organic liquid hydrogen storage material. An electrochemical process of using water to perform direct electrochemical hydrogenation on an organic liquid hydrogen storage material and an electrochemical process of a direct fuel cell based on a hydrogen carrying organic liquid hydrogen storage material may be regarded as reversible chemical processes, thus an energy source utilization system that directly uses a hydrogen carrying/hydrogen storage material as an energy source carrier is achieved.

The beneficial advantages of the present invention are as follows. The technical solutions provided by certain embodiments of the present invention can provide a basis for constructing a novel direct fuel cell and hydrogenation electrolytic tank. These two apparatuses and a specific organic liquid hydrogen storage material are used in a hydrogen energy utilization process, where the hydrogenation process and the hydrogen storage process are combined, and the dehydrogenation process and the hydrogen use process are combined. In the entire process, hydrogen energy is not utilized in a hydrogen molecule form, thus simplified and optimized a conventional hydrogen storage process. As compared with the conventional hydrogen energy utilization process, such a brand new hydrogen energy utilization process reduces energy consumption in the process of storing and releasing hydrogen gas, thereby greatly improving the utilization rate of the energy source. Moreover, such a process still inherits the advantages such as environmental friendliness and sustainability of a general hydrogen energy utilization process. The technical solutions provided in the patent of the present invention are the key to the foregoing novel hydrogen energy utilization manner.

Embodiment 1

An electrode material for a direct fuel cell or an electrochemical hydrogenation electrolytic tank is $MoO_3$.

Tests and illustration are given below with regard to the catalystic property, proton storage, and electrical conductivity of $MoO_3$:

1. Catalystic Property:
a) Computer Simulation Test:

A 10×10×10 supercell is adopted to calculate, in an optimized manner, energy of cyclohexane, benzene+hydrogen molecules, benzene, and the hydrogen molecules in the supercell, respectively. The enthalpy change in dehydrogenation of cyclohexane to generate benzene and hydrogen gas is energy of benzene+hydrogen molecules minus energy of cyclohexane.

One (3×3) supercell is built on a (010) surface of $MoO_3$, a vacuum layer is 12 A, and a surface base includes two molybdenum layers. Energy of cyclohexane and benzene in the 10×10×10 supercell, energy on the surface of $MoO_3$, energy of cyclohexane on the surface of $MoO_3$, energy of dehydrogenation of cyclohexane to generate benzene and $H_nMoO_3$, and energy on the surface of $H_nMoO_3$ are calculated, respectively. The enthalpy change of dehydrogenation of cyclohexane to generate benzene and $H_nMoO_3$ is energy of dehydrogenation of cyclohexane to generate benzene and $H_nMoO_3$ minus energy of cyclohexane on the surface of $MoO_3$.

The foregoing computational simulation is used to compare energy changes between direct dehydrogenation of the hydrogen carrying organic liquid hydrogen storage molecule, that is, cyclohexane to generate hydrogen gas and a process of dehydrogenation of the cyclohexane molecule and the $MoO_3$ to generate protons.

All the calculation is performed in VASP program, and a PBE exchange-correlation function and generalized gradient approximation (GGA) of spin polarization are adopted to obtain solutions to a Kohn-Sham equation. In the calculation process, projector augmented wave (PAW) method is used to describe mutual correlation potentials of electrons and particles. During processing of a wave function of a valence electron, a basis set for a plane wave is used for expansion, and 400 ev is taken as cut-off energy of the expansion. During structural optimization, a conjugate-gradient (CG) algorithm is adopted to perform structural optimization on unfixed particles in a system, and a convergence standard is that the magnitude of a system force is smaller than 0.03 ev/Å. The obtained calculation result can reflect to a certain degree a practical chemical reaction situation of actual reaction substances.

The test results are as follows:

1) During direct dehydrogenation, the enthalpy change of dehydrogenation of cyclohexane to generate benzene and hydrogen gas is 2.752 eV (63.461 kcal/mol), and on average the enthalpy change of dehydrogenate each hydrogen molecule is 21.154 kcal/mol (FIG. 1 is a schematic diagram of computational simulation of direct dehydrogenation of cyclohexane).

Figure 2:
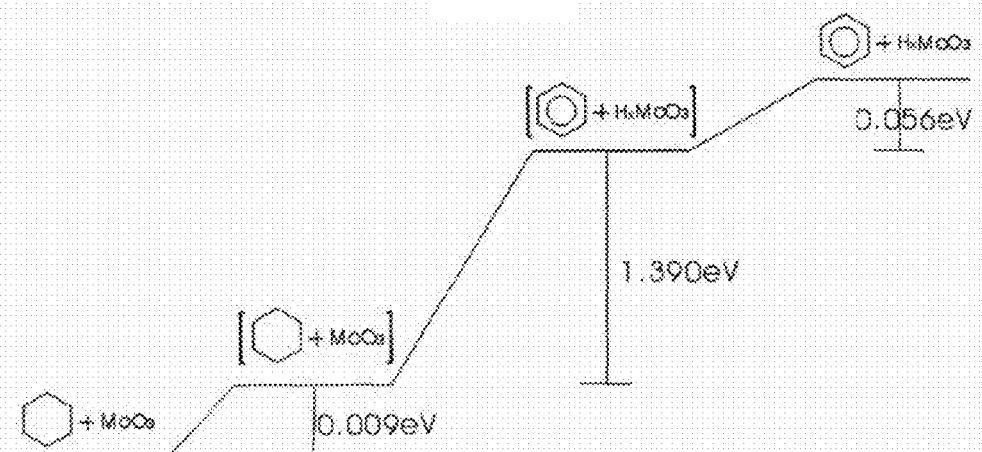
FIG. 2 is a schematic diagram of computational simulation of a dehydrogenation process in a reaction of cyclohexane and $MoO_3$.
Figure 3:
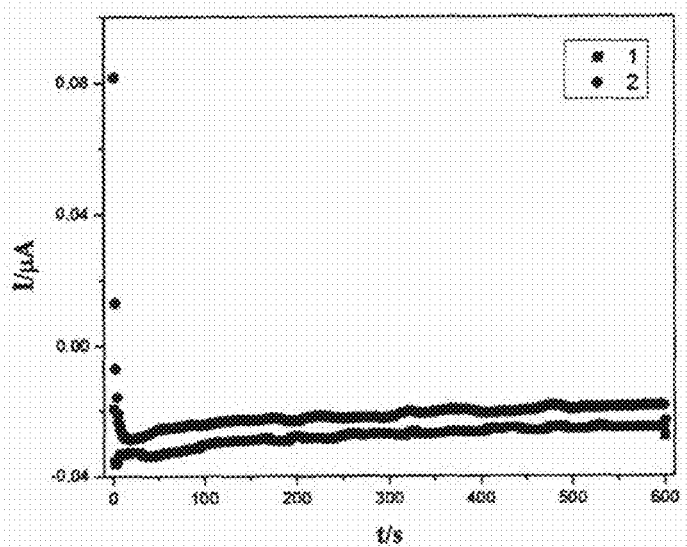
FIG. 3 is a curve of constant potential step of a microelectrode of $H_{0.9}MoO_3$ powder.

2) During surface dehydrogenation on the surface of molybdenum oxide, the enthalpy change of dehydrogenation of cyclohexane to generate benzene and $H_nMoO_3$ is 1.390 eV (32.053 kcal/mol), and on average the enthalpy change of dehydrogenate each hydrogen molecule is 10.684 kcal/mol (FIG. 2 is a schematic diagram of computational simulation of a dehydrogenation process in the reaction of cyclohexane and $MoO_3$).

Through the comparison in 1) and 2), it indicates that as compared with direct dehydrogenation of cyclohexane, the reaction enthalpy change of dehydrogenation in a reaction of cyclohexane and $MoO_3$ is clearly reduced.

b) Experimental Verification:

0.3 gram (g) of $MoO_3$ is weighed out, 0.6 g of perhydro-N-ethylcarbazole (a hydrogen carrying organic liquid hydrogen storage molecule) is taken, both of them are added in a 100 mL small flask, and stirred and refluxed in an oil bath at 180° C. for 3 hours (hrs). After the reaction ends and the product is naturally cooled, the product is washed 3-5 times by centrifugation using methanol, to remove the organic compounds that have taken part in the reaction and the organic compounds that have been generated. The obtained dark blue solid is placed in a vacuum drying chamber, and dried for 48 hrs at 30° C.-60° C., so as to obtain dark blue $H_nMoO_3$.

The intercalation amount of protons in the foregoing material is determined by chemical titration. Specifically, molybdenum with a low oxidation number in $H_nMoO_3$ is oxidized to molybdenum with a high oxidation number using $AgK_3(SCN)_4$ complex solution, and generate the element Ag. The metal Ag is collected, and the content of Ag is determined using common argentometry titration (KSCN titration). Finally the proton content in $H_nMoO_3$ is calculated. The determined chemical formula of the product is $H_{0.13}MoO_3$.

It is proven through a) and b) that $MoO_3$ has a desirable catalystic property for organic liquid hydrogen storage molecules such as cyclohexane and hydro-N-ethylcarbazole, and has a certain proton storage capability.

2. Electrical Conductivity:

The $MoO_3$ powder and phenol formaldehyde resin powder are mixed uniformly with a mass ratio of 7:3, and pressed under 10 Mpa pressure for 10 minutes (min) to make a round chip with a diameter of 16 millimeter (mm) and a thickness of 1 mm. Next, an alternating-current impedance method is used to measure the resistivity of the foregoing two samples. The measurement result is that: the $MoO_3$-containing round chip material has a resistivity>$10^8$ Ω-cm, and is a semiconductor. Although $MoO_3$ does not have a high electrically conductive capability, when being used as an electrode material, $MoO_3$ is converted into $H_nMoO_3$ having desirable electrical conductivity due to proton intercalation and the use of $MoO_3$ as an electrode is not affected. The electrical conductivity of $H_nMoO_3$ will be shown in the following embodiments.

3. Proton Conduction Capability:

Although the electrical conductivity of $MoO_3$ is not optimal, when $MoO_3$ is made into an electrode material and applied in a direct fuel cell based on an organic liquid hydrogen storage material or a hydrogenation electrolytic tank, $MoO_3$ is converted into a corresponding proton intercalation compound. Therefore, as long as the corresponding conversion resultant, that is, the proton intercalation compound, has a desirable proton conduction capability, it indicates that the proton conduction capability of $MoO_3$ can also meet the requirements. For the desirable proton conduction capability of $H_nMoO_3$, reference may be made to the following embodiments.

Embodiment 2

An electrode material for a direct fuel cell or an electrochemical hydrogenation electrolytic tank is $H_{0.9}MoO_3$.

A conventional method is used for preparing $H_{0.9}MoO_3$. Specifically, 6 g of $MoO_3$ is added into 2 M to 3 M of dilute hydrochloric acid solution, and the mixture is magnetically stirred under 0° C. to 10° C. ice bath. 1 g of Zn powder is weighted and added to the foregoing mixed solution through several times. After the reaction is complete, the mixture is washed several times using dilute hydrochloric acid and reverse osmosis (RO) water respectively, and finally separated by centrifugation. A dark blue solid $H_{0.9}MoO_3$ is obtained, and the obtained solid is dried in an oven at 80° C. for 5 hrs.

Tests and illustration are given below with regard to the catalystic property, proton storage, and electrical conductivity of $H_{0.9}MoO_3$:

1. Catalytic Property:

0.3 g of $H_{0.9}MoO_3$ is weighed out, 0.6 g of perhydro-N-ethylcarbazole (the hydrogen carrying organic liquid hydrogen storage molecule) is taken, both of them are added in a 100 mL small flask, and stirred and refluxed in an oil bath of 120° C. for 6 hrs. After the reaction ends and the product is naturally cooled, the product is washed 3-5 times by centrifugation using methanol, to remove the organic compounds that have taken part in the reaction and the organic compounds that have been generated. The obtained dark blue solid is placed in a vacuum drying chamber, and dried for 48 hrs at 30° C.-60° C., so as to obtain dark blue $H_nMoO_3$.

The intercalation amount of protons in the foregoing material is determined by chemical titration. Please refer to Embodiment 1 for the specific method. The determined chemical formula of the dark blue $H_nMoO_3$ is $H_{1.21}MoO_3$. Therefore, it is proved that $H_{0.9}MoO_3$ has a desirable catalystic property for the organic liquid hydrogen storage molecule, that is, hydro-N-ethylcarbazole, and has a certain proton storage capability.

2. Electrical Conductivity:

The $H_{0.9}MoO_3$ powder and phenol formaldehyde resin powder are mixed uniformly with a mass ratio of 7:3, and pressed under 10 Mpa pressure for 10 min to make a round chip with a diameter of 16 mm and a thickness of 1 mm. Next, an alternating-current impedance method is used to measure the resistivity of the foregoing two samples. The measurement result is that: the $H_{0.9}MoO_3$-containing round chip material has a resistivity <$10^{-1}$ Ω-cm and is a conductor.

3. Proton Conduction Capability:

Particle diameter of the prepared $H_{0.9}MoO_3$ is measured using ZETA potential analysis and laser granularity analysis. Transfer coefficient of protons in the product is measured using chronoamperometry for a constant potential step (FIG. 3 is a curve of a constant potential step of a microelectrode of $H_{0.9}MoO_3$ powder).

The experimental result after calculation and analysis show that the particle diameter of the product $H_{a9}MoO_3$ is: 0.24 μm to 1.00 μm. It is obtained through calculation that a transfer coefficient of protons in $H_{0.9}MoO_3$ is $5.7 \times 10^{-15}$ $m^2/s$ to $0.8 \times 10^{-13}$ $m^2/s$, and the proton conduction capability is desirable.

Embodiment 3

An electrode material for a direct fuel cell or an electrochemical hydrogenation electrolytic tank is $H_{0.23}WO_3$.

The catalystic performance, proton storage and conductivity, and electrical conductivity of the material are verified in the same manner as that in the Embodiment 2. The results show that:

1. $H_{0.23}WO_3$ can react with hydro-N-ethylcarbazole (the reaction temperature is 150° C. and the time is 3 hrs) to form the material $H_{0.43}WO_3$, which has catalyst dehydrogenation property and proton storage property.

2. The proton conduction coefficient of the material $H_{0.23}WO_3$ is in the order of $10^{-14}$ $m^2/s$, and the material has desirable proton conductivity.

3. The material of $H_{0.23}WO_3$ has a resistivity <$10^{-1}$ Ω-cm and is a conductor.

Embodiment 4

An electrode material for a direct fuel cell or an electrochemical hydrogenation electrolytic tank is a mixture of $MoO_3$ and $H_{0.33}MoO_3$ in any mass ratio.

$H_{0.33}MoO_3$, which has a proton content of 0.33, is mixed uniformly with $MoO_3$ at a mass ratio of 1:1. The catalystic property, proton storage and conductivity, and electrical conductivity of the mixture are verified using the same methods as those used in the Embodiment 2. The results show that:

1. The mixture reacts with hydro-N-ethylcarbazole (the reaction temperature is 180° C. and the time is 3 hrs), and completely converted into $H_{0.19}MoO_3$.

When the concentration of protons in $H_nMoO_3$ is relatively low, protons in the organic hydrogen storage molecules are easily dehydrogenated under the catalysis of $MoO_3$ or low-proton content $H_nMoO_3$ to form $H_nMoO_3$ with high proton content. However, high-proton content $H_nMoO_3$ has limited stability, and the proton content of the high-proton content $H_nMoO_3$ is closely related to temperature. When temperature rises, the protons in $H_nMoO_3$ are released again. This is the very advantage of $H_nMoO_3$ for being used in a fuel cell electrode, and it can be ensured that during a working process of the fuel cell, hydrogen energy is conveyed from an anode to a cathode easily in a hydrogen atom (or proton) form to cause an electrochemical reaction. Therefore, the forming of $H_{0.19}MoO_3$ by mixing $MoO_3$ with $H_{0.33}MoO_3$ is caused by a relatively high reaction temperature. It indicates that $H_nMoO_3$ with different proton content not only has a catalystic property, but also has desirable proton storage and conductivity.

2. The proton conduction efficiency is reduced after mixing, and the proton conduction coefficient is about $10^{-15}$ $m^2/s$.

3. After mixing, the electrical conductivity is slightly reduced, and the resistivity of the material <1 Ω-cm.

Embodiment 5

An electrode material for a direct fuel cell or an electrochemical hydrogenation electrolytic tank is $H_{0.37}V_2O_5$.

The catalystic performance, proton storage and conductivity, and electrical conductivity of the material are verified in the same manner as that in the Embodiment 2. The result shows that:

1. $H_{0.37}V_2O_5$ reacts with hydro-N-ethylcarbazole (the reaction temperature is 150° C. and the time is 3 hrs) to form the material $H_{0.55}V_2O_5$, which has catalyst dehydrogenation property and proton storage property.

2. The proton conduction coefficient of the material $H_{0.37}V_2O_5$ is in the order of $10^{-14}$ $m^2/s$, and the material has desirable proton conductivity.

3. The material $H_{0.37}V_2O_5$ has a resistivity $<10^{-1}$ Ω-cm, and is a conductor.

Embodiment 6

An electrode material for a direct fuel cell or an electrochemical hydrogenation electrolytic tank is a mixture of $H_{0.34}MoO_3$ and $TiO_2$.

$H_{0.34}MoO_3$ and $TiO_2$ are mixed uniformly, where the mass of $TiO_2$ is about 49.9% of the total mass. The proton storage and conductivity and electrical conductivity of the material are verified using the same methods as those used in the Embodiment 2. The result shows that:
1. The proton conduction efficiency is reduced after mixing, and the proton conduction coefficient is about $10^{-15}$ m²/s.
2. After mixing, the electrical conductivity is slightly reduced, and the resistivity of the material is 10 Ω-cm to 100 Ω-cm.

Embodiment 7

An electrode material for a direct fuel cell or an electrochemical hydrogenation electrolytic tank is a mixture of $H_{0.34}MoO_3$ and $Fe_2O_3$.

$H_{0.34}MoO_3$ and $Fe_2O_3$ are mixed uniformly, where the mass of $Fe_2O_3$ is about 0.001% of the total mass. The proton storage and conductivity and electrical conductivity of the material are verified using the same methods as those used in the Embodiment 2. The result shows that:
1. The proton conduction efficiency is reduced after mixing, and the proton conduction coefficient is about $10^{-15}$ m²/s.
2. After mixing, the electrical conductivity is slightly reduced, and the resistivity of the material is 10 Ω-cm to 100 Ω-cm.

Embodiment 8

An electrode material for a direct fuel cell or an electrochemical hydrogenation electrolytic tank is a mixture of $H_{0.34}MoO_3$ and Pd.

$H_{0.34}MoO_3$ and the metal Pd are mixed uniformly, where the mass of Pd is about 0.001% of the total mass. The proton storage and conductivity and electrical conductivity of the material are verified using the same methods as those used in the Embodiment 2. The result shows that:
1. The measured proton conduction coefficient is ~$10^{-14}$ m²/s.
2. After mixing, the resistivity of the material <1 Ω-cm.

Embodiment 9

An electrode material for a direct fuel cell or an electrochemical hydrogenation electrolytic tank is a mixture of $H_{0.34}MoO_3$ and Ni.

$H_{0.34}MoO_3$ and metal Ni are mixed uniformly, where the mass of Ni is about 10% of the total mass. The proton storage and conductivity and electrical conductivity of the material are verified using the same methods as those used in the Embodiment 2. The result shows that:
1. The measured proton conduction coefficient is ~$10^{-14}$ m²/s.
2. After mixing, the resistivity of the material <0.1 Ω-cm.

Embodiment 10

A direct fuel cell includes an electrode, where the material of the electrode is the electrode material as described in Embodiments 1-9. In one embodiment, the material of the electrode is the electrode material as described in Embodiment 5. In this embodiment, the fuel cell is a direct fuel cell based on an organic liquid hydrogen storage material, and the organic liquid hydrogen storage material is hydro-N-ethylcarbazole, cyclohexane or hydronaphthalene. It is understood that the type of the fuel cell is not limited to the choice made in this embodiment, and may further be a fuel cell of another type.

Embodiment 11

An electrochemical hydrogenation electrolytic tank includes an electrode, where the material of the electrode the electrode material as described in Embodiments 1-9. In one embodiment, the material of the electrode is the electrode material in Embodiment 6.

Embodiment 12

In one embodiment, the present invention relates to a method of making a direct fuel cell of Embodiment 10. The electrode material as described in any of the above Embodiments 1-9 is used to make the electrode, and the liquid hydrogen storage material, such as hydro-N-ethylcarbazole, cyclohexane or hydronaphthalene, is used for storing hydrogen energy. On the one hand, the direct fuel cell, when in operation, is configured to utilize the hydrogen energy stored in the hydrogen storage material through the function of the electrode material, without generating hydrogen gas or hydrogen molecule. On the other hand, the hydrogen storage material is recyclable based on the mechanism according to certain embodiments of the invention.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A direct fuel cell, comprising: an electrode formed of an electrode material consisting of a component A and a component B,
wherein the component A is $H_{0.33}MoO_3$;
wherein the component B is $MoO_3$; and
wherein $H_{0.33}MoO_3$ is mixed uniformly with $MoO_3$ at a mass ratio of 1:1.
2. An electrochemical hydrogenation electrolytic tank, comprising: an electrode formed of the electrode material consisting of a component A and a component B,
wherein the component A is $H_{0.33}MoO_3$;
wherein the component B is $MoO_3$; and
wherein $H_{0.33}MoO_3$ is mixed uniformly with $MoO_3$ at a mass ratio of 1:1.

* * * * *